UNITED STATES PATENT OFFICE.

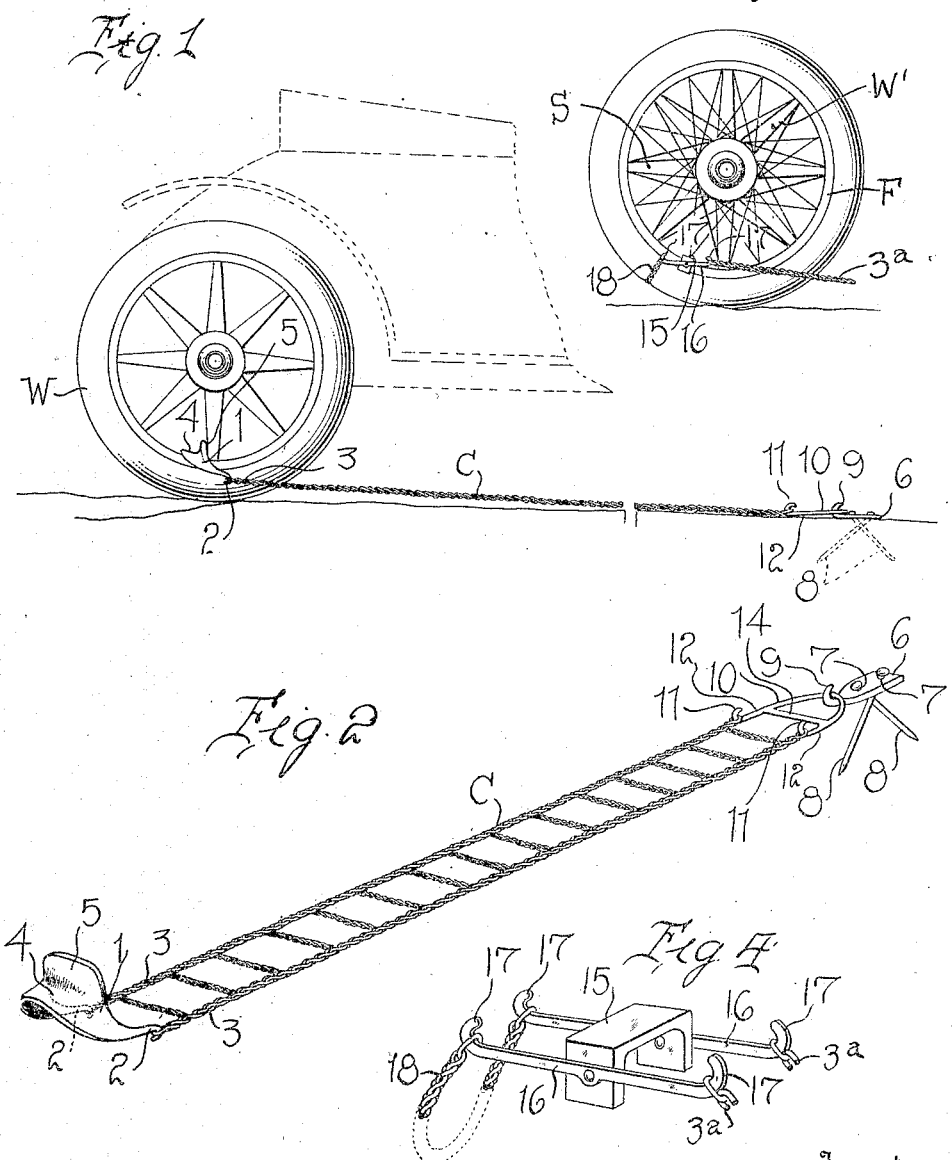

ELMER WHITMER, OF GLENDIVE, MONTANA.

MEANS FOR EXTRACTING WHEELS OF POWER-DRIVEN VEHICLES FROM HOLES.

1,171,910.  Specification of Letters Patent.  Patented Feb. 15, 1916.

Application filed March 6, 1915. Serial No. 12,688.

*To all whom it may concern:*

Be it known that I, ELMER WHITMER, a citizen of the United States, residing at Glendive, in the county of Dawson and State of Montana, have invented certain new and useful Improvements in Means for Extracting Wheels of Power-Driven Vehicles from Holes, of which the following is a specification, reference being had to the accompanying drawings.

This invention relates to certain improvements in means for extracting wheels of power driven vehicles from holes, and it is an object of my invention to provide novel and improved means of this general character wherein the drive wheels of the vehicle may be employed as the operative power.

Furthermore, it is an object of my invention to provide novel and improved means of this general character whereby the anti-skidding or mud chains now in general use may be employed with convenience and facility.

It is also an object of my invention to provide novel and improved means of this general character including a flexible member adapted to be operatively engaged with a drive wheel and with a stationary anchoring member whereby said flexible member will be automatically disengaged from the stationary anchoring member as the wheel passes thereover.

The invention consists in the details of construction and in the combination and arrangement of the several parts of my improved device whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is an elevational view illustrating an embodiment of my invention in operative assemblage; Fig. 2 is a view in perspective of the means as herein embodied, and disengaged from a driving wheel; Fig. 3 is an elevational view illustrating a further embodiment of my invention, as relates to the wheel engaging means, in applied position; and Fig. 4 is a view in perspective, detached, of the wheel engaging member as disclosed in Fig. 3.

While in practice, I find it particularly desirable to employ an equipment as hereinafter described, in connection with both of the drive wheels of a motor vehicle, I will only describe my equipment as employed in connection with a single driving wheel, as it is thought that this will be sufficient for the purpose of disclosure.

As set forth in the accompanying drawings, W denotes a rear driving wheel of a motor driven vehicle and of conventional form and C denotes an anti-skidding or mud chain of conventional construction such as the well known Weed chain, although I do not wish to be understood as limiting myself to any particular style of chain. I also wish it to be understood that in lieu of chains, other flexible members may be employed, such as cables, as will be, it is thought, clearly obvious to those skilled in the art to which my invention appertains.

1 denotes a yoke adapted to bridge or straddle the rim or felly of the wheel W and the free extremities of the yoke terminate in the hook members 2 so that the same may be readily engaged with the parallel members 3 of the chain C, in a manner which is believed to be self-evident, and the connecting portion 4 of the yoke is provided with the angularly disposed flanges 5 adapted to afford an increased bearing surface for contact with the inner face of the rim or felly and an adjacent spoke of the wheel structure W.

6 denotes an anchoring member provided with the opening 7 through which are adapted to be disposed the securing stakes 8, whereby it will be readily perceived that the anchoring plate 6 will be maintained upon the ground in a substantially stationary manner. One extremity of the plate 6 is provided with the upstanding and rearwardly disposed hook member 9 with which is loosely engaged the yoke 10, the free extremity whereof being also provided with the hooks 11 adapted for convenient engagement with the parallel members 3 and the stems 12 of the yoke 10 at a point intermediate their lengths are tied or connected by the transverse member 14 in order to increase the efficiency of the yoke.

It is to be particularly noted that as the wheel W passes beyond the anchoring plate 6, the yoke 10 will be automatically disengaged from the hook member 9 whereby the possibility of injury to the wheel structure is entirely eliminated.

In the form of invention illustrated in Figs. 3 and 4, I employ a wheel engaging member including a yoke 15 adapted to straddle the felly F of a wheel, said yoke being substantially U-shape in form, and pivotally engaged intermediate their lengths with the stems of said yoke 15 are the levers 16 terminating at their opposite extremities in the hook member 17 and with adjacent hook members 17 are adapted to be secured the parallel members 3ª of an antiskidding chain or the like. Detachably engaged with the opposite hook members 17 are the extremities of the flexible member 18 which is adapted to straddle the tread portion of the wheel W' whereby it will be perceived that upon rotation of the wheel W', the resultant strain imposed upon the arm 16 will serve to effectively secure the yoke 15 in operative position. This form of securing means is particularly desired when the spokes S of the wheel structure are of wire or the like.

From the foregoing description, it is thought that a means for extracting wheels of power driven vehicles from holes constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement herein shown in carrying out my invention in practice.

I claim:

1. Means for the purpose set forth comprising an anchoring plate provided with perforations, an upstanding and rearwardly disposed hook member carried by one extremity of the plate, a yoke detachably engageable with the hook member, a flexible member engageable with the extremities of the yoke, and wheel engaging means engageable with the flexible member.

2. Means for the purpose set forth comprising an anchoring plate provided with securing means, a flexible member engageable with the plate, a yoke adapted to straddle the rim portion of a wheel structure, arms pivotally engaged with the yoke and positioned at opposite sides of the rim portion, the opposite extremities of said arms being provided with hooks, said flexible member being engageable with the hooks at adjacent extremities of the arms, and a second flexible member engageable with the opposite hooks of the arms and adapted to straddle the tread portion of the wheel structure.

In testimony whereof I hereunto affix my signature in the presence of two witnesses.

ELMER WHITMER.

Witnesses:
F. S. P. Foss,
E. Martmun.